May 8, 1951  B. M. MILLER  2,552,103
APPARATUS FOR MANUFACTURING CUTLERY
Filed May 27, 1949  4 Sheets-Sheet 1
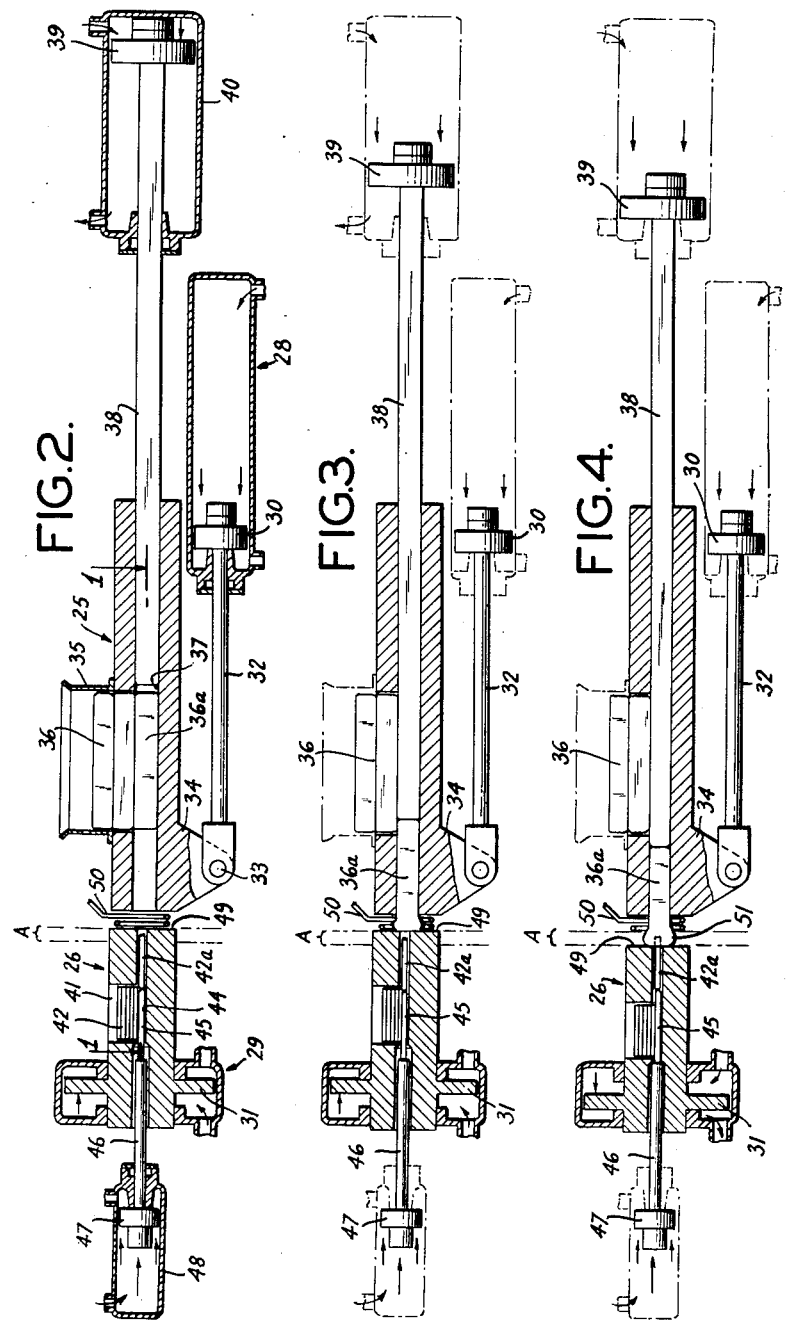
INVENTOR.
BERNARD M. MILLER
BY
*E. R. Poznack*
ATTORNEY.

May 8, 1951  B. M. MILLER  2,552,103
APPARATUS FOR MANUFACTURING CUTLERY
Filed May 27, 1949  4 Sheets-Sheet 2
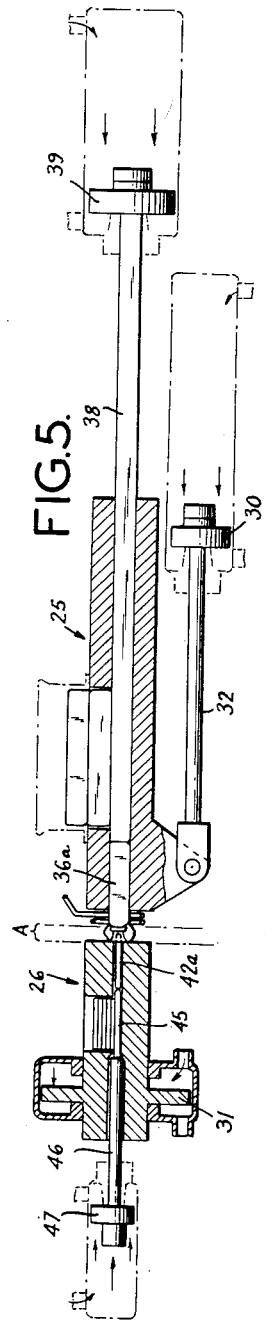
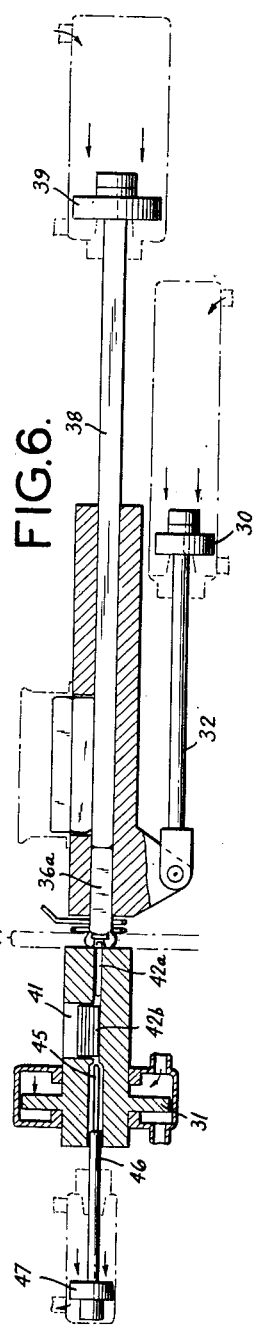
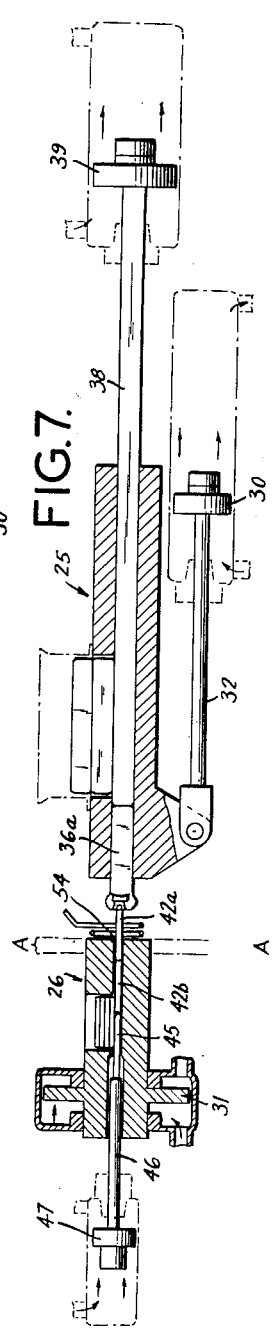
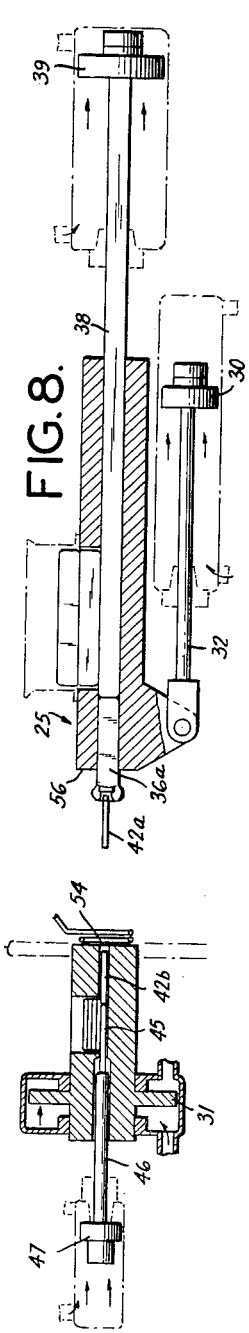
*INVENTOR.*
BERNARD M. MILLER
BY
*ATTORNEY.*

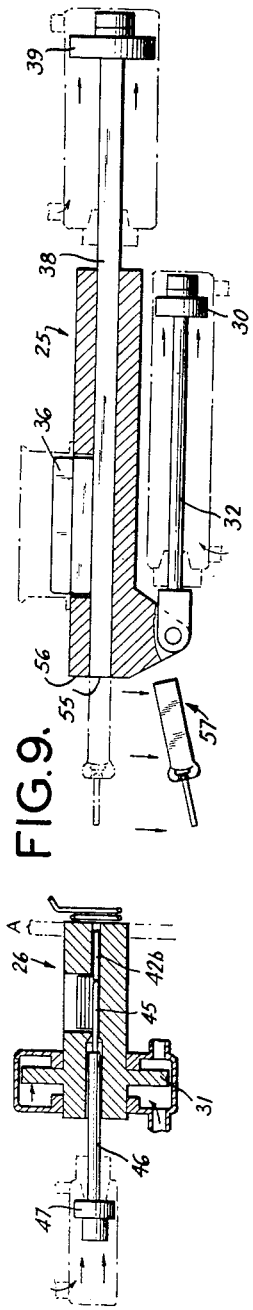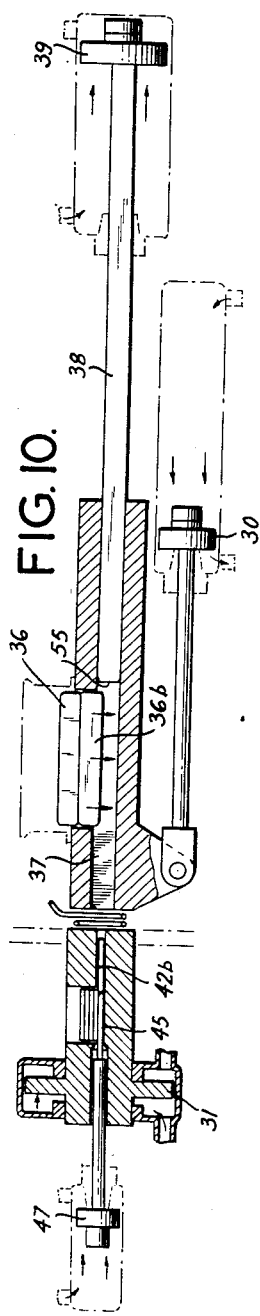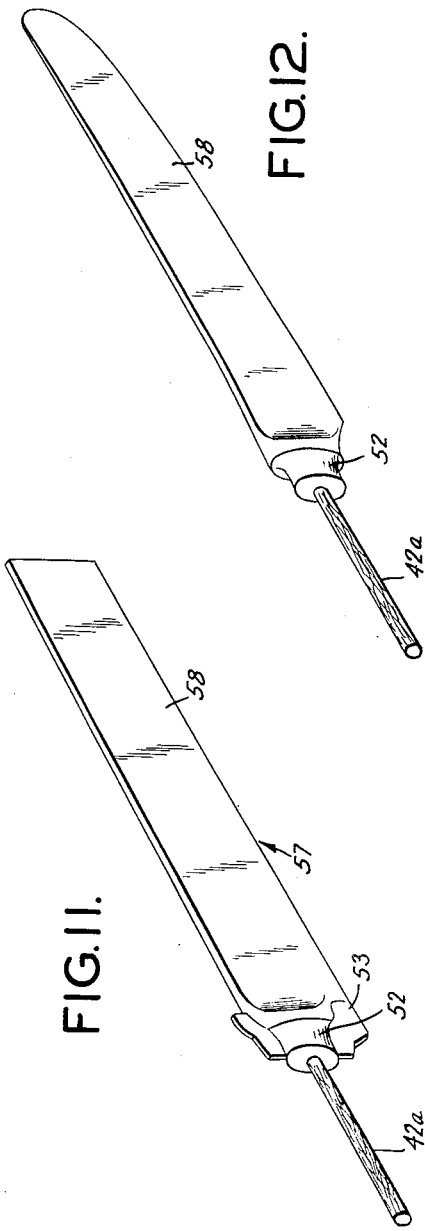

May 8, 1951 B. M. MILLER 2,552,103
APPARATUS FOR MANUFACTURING CUTLERY
Filed May 27, 1949 4 Sheets-Sheet 4
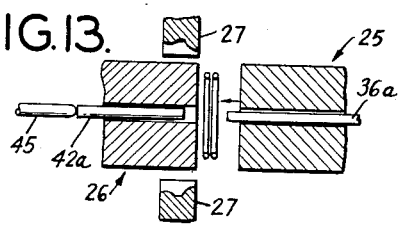
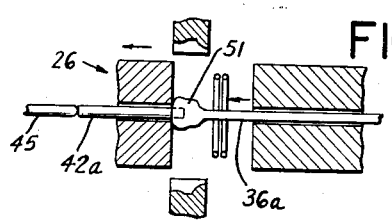
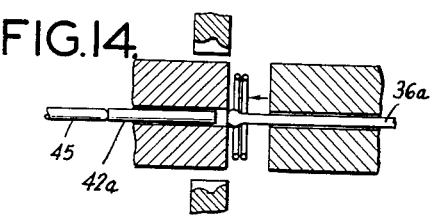
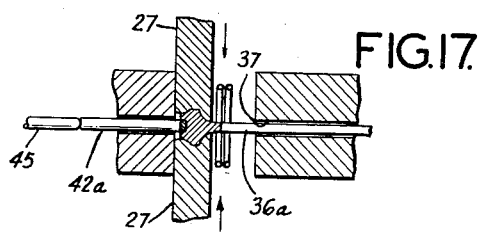
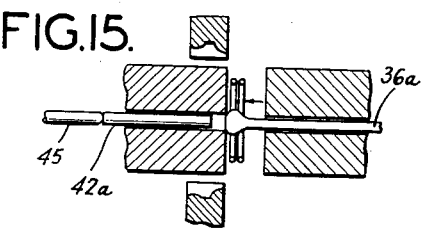
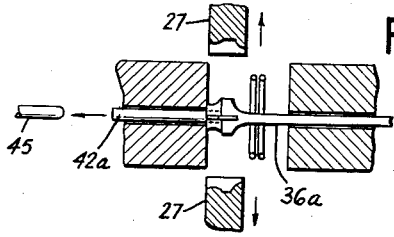
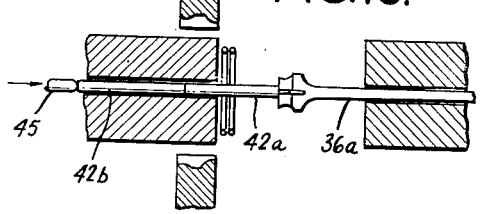
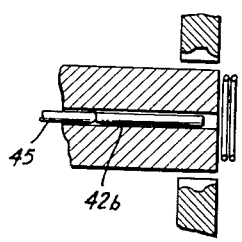
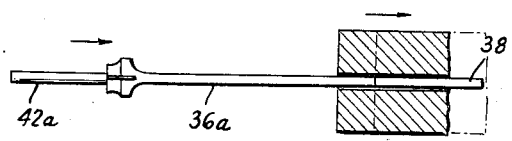
INVENTOR.
BERNARD M. MILLER
BY
ATTORNEY.

Patented May 8, 1951

2,552,103

UNITED STATES PATENT OFFICE 2,552,103

APPARATUS FOR MANUFACTURING CUTLERY

Bernard M. Miller, Sheffield, England

Application May 27, 1949, Serial No. 95,624

13 Claims. (Cl. 76—1)

This invention relates to the fabrication of cutlery, and more particularly to the manufacture of knives of stainless steel, as well as chisels and various tools of high carbon steel.

In the conventional methods of manufacturing implements of the classes above-mentioned, it is the general practice to employ either bar or round stock of wrought iron, and then form the desired product by a series of forging, heat treating, blanking, stamping and finishing operations. Among the methods employed, two general systems predominate. In one system, the stock is drop-forged a number of times under heat to obtain flat blanks, whereafter it is cut, trimmed and polished. This system has been found to be wasteful of material, and involves costly handling operations. The other system widely used, particularly in England, involves a larger number of steps, especially where a high quality final product is desired. In the manufacture of a knife with a bolster (which is generally needed both for strength and appearance), drop-forging operations under heat are performed to form the bolster and a blob for the tang; and thereafter the blade is rolled out under heat, the implement annealed, the flash cut, and the blank trimmed. The blob is then drawn to a tang under heat by a forging hammer, requiring the further step of drop forging the bolster to bring it back into line. And the hardening, tempering and finishing operations are then performed.

In the conventional methods above-referred to, it is known that uniform jobs are difficult to obtain, and precision work on a mass production basis is practically impossible, in view of the multiplicity of forging operations required.

The expedient is frequency resorted to of obtaining an imitation bolster by molding of lead or other relatively soft material upon the body of the implement. Such a construction is generally inadequate and results in an inferior product, since the imitation bolster serves practically no supporting function. Furthermore, cracks generally develop between the imitation bolster and the body of the implement resulting in the accumulation of dirt or foreign matter within the fissures, and make it difficult to clean the implement.

It is because of the difficulties above-mentioned that venture capital for the production of steel cutlery is scarce; and it is for this reason that there are relatively few plants for the manufacture of steel cutlery compared with those manufacturing forks, spoons and the like.

It is primarily within the contemplation of my invention to provide a method and apparatus for the manufacture of steel and analogous cutlery that will obviate the aforesaid difficulties and disadvantages connected with the industry. More particularly, it is an object of my invention to enable stainless steel and high carbon tools, especially knives, to be fabricated from steel sheets, and even from partially finished stainless steel sheets, whereby relatively few operations will be required, and where, in particular, the many forging steps conventionally employed in such a process will be eliminated.

In the above-mentioned aspect of my invention, it is an object to provide an apparatus and method effectuating a continuous process involving a comparatively simple sequence of steps to produce a substantially completed tool with bolster and tang, requiring only a simple trimming operation thereafter, and whatever finishing step may be needed for the particular implement.

It is a further object of my invention to provide an apparatus and method that will enable the mass production of stainless and high carbon steel tools with precision and uniformity and at a minimum of cost.

Still a further object of my invention is to enable the apparatus above-mentioned to be employed also for the manufacture of implements of softer material, such as nickel and silver.

And it is within my contemplation to provide an apparatus of the type above-mentioned, the essential components of which are relatively simple and readily purchasable apparatus.

Other objects, features and advantages will appear from the drawings and the description hereinafter given.

Referring to the drawings,

Figure 1 is a fragmentary sectional plan of a portion of the apparatus of my invention showing the relative positions of the blank and tang feeds, the heating coil and the bolster forming dies, the section being taken substantially along line 1—1 of Figure 2.

Figure 2 is a longitudinal section of the apparatus of my invention, taken substantially along line 2—2 of Figure 1, showing all the essential components in the initial position at the beginning of a cycle of operations.

Figures 3 to 8 are views like that of Figure 2, showing various steps in sequence in the practice of my invention, certain of the components being schematically shown in dot-dash.

Figure 9 is a view like Figure 2, but showing the completed implement ejected from the carrier.

Figure 10 is another view substantially like Figure 2, showing a new blank in the process of dropping into position preparatory to the start of a new cycle.

Figure 11 is an enlarged perspective view of a knife blank as completed on the apparatus above-mentioned, with bolster and tang, but before the trimming operation.

Figure 12 is a perspective view of the implement of Figure 11, after the blanking and finishing operation.

Figure 13 is a somewhat enlarged fragmentary sectional plan, substantially like that of Figure 1, but showing the position of the parts between the steps exemplified by Figures 2 and 3.

Figures 14 to 16 are views like Figure 13, showing successive positions of the blank and tang.

Figure 17 is a view like Figure 13, showing the complementary die members in engagement with the blank at the tang, to form the bolster.

Figures 18 to 20 include the sequence of steps immediately preceding that of ejecting the formed blank as shown in Figure 9.

In the particular embodiment of my invention illustrated, there are three main movable components, the carrier 25, the anvil 26 and the two complementary dies 27. To operatively actuate the carrier and anvil, the drawings show, for illustrative purposes only, the hydraulic drivers 28 and 29, respectively, the former containing the piston 30 and the latter the piston 31. Piston 30 actuates the rod 32 which is pivotally connected at 33 with the downwardly extending lug 34 of the carrier 25. The piston 31 is illustrated as being integral with anvil 26. The inlet and outlet ports of the fluids of the hydraulic cylinders are semidiagrammatically illustrated and are of conventional construction well-known in the art and are not described in detail since such description is not too necessary for an understanding of the present invention. It will be noted that the stroke or travel of piston 31 is considerably less than that of piston 30 since, as will more clearly hereinafter appear, carrier 25 requires a relatively large retractive movement, to enable the entire blank and tang to be cleared so that it will drop out as indicated in Figure 9, whereas the movement of anvil 26 need be sufficient only to remove it from between the opposing dies 27, whereby these dies will be free to move into the space between the said carrier and anvil.

Mounted on top of the carrier 25 is the hopper 35 to permit the fitting into the carrier of the knife strip blanks 36, these blanks being stacked vertically with the lowermost blank 36a disposed within the longitudinal slot 37 in the carrier. It is preferred that the height and width of the slot be proportioned to slidably accommodate therein each of the blanks 36. Slidably disposed within said slot 37, and extending from the rear of hopper 36, is the ram 38 connected to the piston 39 of the hydraulic cylinder 40. The length of the ram 38 and the stroke of piston 39 are proportioned so as to permit the foremost terminal of the ram to be in pressing engagement with the rear of blank 36a when it is in its foremost position against the retracted anvil 26 (Figure 6), and also so that the ram 38 will be retractable to a position behind hopper 35 (Figure 2).

The anvil 26 is provided with a recessed portion 41 which serves as a hopper for the tangs 42 stacked vertically so that the lowermost tang 42a is disposed within the axial bore 44 of the anvil. The axis of said bore 44 would be in alignment with the horizontal axis of slot 37 if the tang is required to be disposed medially with respect to the width of the strip blank, the two said axes being offset with respect to each other when the tang is in offset relation with respect to the width of the strip blank, as in the illustration.

Movable longitudinally through bore 44 is the tang ram 45, this being shown connected to the enlarged stem 46 joined to the piston 47 of the hydraulic cylinder 48.

Disposed between the carrier 25 and anvil 26, but in proximity to the operative surface 49 of the anvil, is the induction coil 50, this being electrically connected to a suitable source of current supply sufficient to produce the desired heating of the forward terminal of blank 36a, as will be more clearly hereinafter described. The coil 50 may be of any conventional type known in the art, capable of producing high frequency or induced heating effects within the stock disposed inside of the coil. I have found that a suitable temperature for stainless steel, proportioned to form an ordinary table knife is 2000° F., operating substantially under the conditions illustrated in the drawings.

In the operation of the apparatus above-described, the hydraulic drivers and other elements are operated in predetermined sequence, so as to progressively carry through the method of my invention. In the initial position of the apparatus as illustrated in Figures 1 and 2, piston 39 is in its fully retracted position, piston 30 is in its foremost projected position, pistons 31 and 47 are in their rearmost projected positions. The terms "foremost" and "rearmost" are herein used to indicate, respectively, the extreme left and right positions of the movable apparatus.

The cycle starts from the position shown in Figure 2 with forward movement of plunger 38, whereby the blank 36a is moved forwardly through the position shown in Figure 13 to the positions shown in Figures 4, and 14. As the blank 36a moves forwardly towards the anvil 26, the circuit is closed through coil 50, so that when the blank reaches a position within the coil, it will immediately become subjected to its heating effects. Continued pressure is applied by the plunger 38 during its forward movement, to create a blob 51 of predetermined volume sufficient for the subsequent operations, such position being shown in Figure 15, which is just prior to the position shown in Figures 14, and 4. The anvil 26 is now retracted, by the forward movement of piston 31, to the position shown in Figures 4 and 16. It will here be observed that since the position of piston 47 has remained unchanged, the ram 45 will have pushed the tang 42a into the mass of heated material constituting blob 51. In this position the anvil 26 has moved out of the path of the dies 27, said path being indicated by the dot-dash lines bracketed by the letter A in Figures 2 to 4. During the said retractive movement of anvil 26 to the position shown in Figure 4, ram 38 has continued to move forwardly until the piston 39 reached its foremost position in the cylinder. It is thus apparent that pressure is continuously being applied by ram 38 to blank 36a during the retraction of anvil 26, so that the blob 51 is constantly in pressing engagement with the surface 49 of the anvil.

During the next step, the dies 37 approach each other and operatively engage therebetween the heated blob 51. This forms the general shape of the bolster 52, leaving the flash 53 for subsequent trimming (Figure 11). The compressive effort of the dies not only forms the bolster, but firmly presses the material constituting the bolster firmly upon the tang blank 42a so that the latter is firmly and immovably secured to the bolster of blank 36a. Figures 5 and 17 show the position of the apparatus when the dies are in engagement with the bolster.

Immediately thereafter, the dies 37 are withdrawn, and simultaneously with such withdrawal the piston 47 is retracted to the foremost position shown in Figures 6 and 18, the tang ram 45 now being disposed forwardly of the hopper 41 so as to be ready to engage a new tang blank. At this point the circuit of coil 50 may be opened, since no heat is required for the balance of the cycle.

In a continuation of the cycle of operations, pistons 39, 31 and 47 move to the right, rearwardly. This causes a retraction of the carrier 25, a return of the anvil 26 into its position between the opposing dies, and a movement of the new tang 42b towards the outlet 54 of the bore 44 of the anvil. The tang blank 42b engages previously ejected tang blank 42a, and urges it outwardly thereby supplementing the action of carrier 25 in moving the completed blank outwardly towards the right. Figure 7 clearly shows the engagement of tang 42b with tang 42a. The continued retraction of the piston 39 will move the blank 36a together with its tang 42a through the positions shown in Figures 19 and 20 to the final position shown in Figure 3 where the piston 39 has reached the end of its retractive stroke. However, at this point the piston 39 has not reached the end of its rearward movement. Upon a continued rearward movement of piston 39 to the end of its stroke shown in Figure 9, the carrier 25 will be retracted to its rearmost position at which the foremost terminal 55 of the ram 38 will be substantially flush with the foremost end 56 of the carrier. It is obvious that at this point, due to the continued rearward movement of the carrier, the completed blank 57 will drop downwardly to a suitable receptacle (not shown).

The next step, illustrated in Figure 10, indicates that the piston 39 is moved forwardly to its fully projected position, the piston 39 remaining stationary, so that the forward terminal 55 of ram 38 is behind the hopper 36. In this position a new blank 36b is shown dropping into its operative position within the slot 37, whereby the apparatus will be ready for a new cycle.

As aforesaid, when the finished blank 57 is ejected from the apparatus, it is substantially in the form shown in Figure 11. Thereafter, by a suitable stamping and trimming operation, the flash 53 is removed and the blade 58 is shaped, to produce a combination blade and embedded tang as shown in Figure 12.

Where brightly polished sheet stock is originally used, very little finishing or polishing operations are required. But even if there is no bright finish on the original blank, it is nevertheless apparent that the product leaving the apparatus is sufficiently flat and unmutilated so as to render the final finishing step relatively simple, since no marring or deforming operations have been performed on the blade portions 58, as occurs in the conventional methods employing various forging and rolling steps.

It is also apparent that this invention can be used to form implements of softer stock, such as nickel and silver, wherein sharp cutting edges are not required. All that need be done is to eliminate the operation of turning on the current through coil 50, whereby a blob equivalent to 51 is cold-formed, without the use of heat. This is entirely feasible with softer metals upon the application of suitable pressure by the ram 38.

It is thus apparent from the description of my invention, above-given, that cutlery made of stainless or high carbon steel, and provided with a bolster and tang, can be readily fabricated from sheet stock and suitable tang stock, without the necessity of employing a plurality of forging operations as is required in conventional methods.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

I claim:

1. In an apparatus for manufacturing from a flat blank and a tang a cutlery implement with a bolster thereon, the combination of a movable carrier, a movable anvil, a carrier ram, an anvil ram, lateral forming means, and a heating member; the carrier and anvil being in spaced substantially end-to-end relation and movable reciprocatingly towards and away from each other along paths extending substantially in the same longitudinal direction; the carrier having a flat open-ended slot extending longitudinally therein, said slot being adapted to slidably accommodate therein said flat blank, said carrier ram being slidably movable within said slot and adapted to engage the rear end of the blank operatively disposed within the slot, the carrier ram being movable between a retracted position for engagement with said blank and a projected position for partially ejecting the blank through the front of the carrier slot and into pressing engagement with the anvil; the anvil having an open-ended bore extending longitudinally therein, said bore being adapted to slidably accommodate therein said tang, said anvil ram being slidably movable within said slot and adapted to engage the front end of the tang operatively disposed within the bore, the anvil ram being movable between a retracted position for engagement with said tang and a projected position for partially ejecting the tang through the rear of the bore; the said bore being in longitudinal alignment with the said slot, whereby the tang will be brought into penetrating and attaching engagement with the blank when the blank is in operative engagement with the anvil and the tang is in said partially ejected position; the said heating member being disposed between the carrier and anvil, and adjacent the rear operative end of the anvil; the said forming means comprising complementary die members flanking the rear portion of the anvil and movable transversely for operative engagement with the forward terminal of the said blank when it is in engagement with the anvil, said anvil being retractable to permit the transverse operative movement of said die members, the carrier being retractable to provide clearance between the carrier and anvil, whereby the blank and attached tang may be removed from the carrier.

2. In an apparatus for manufacturing from a blank and a tang a cutlery implement with a bolster thereon, the combination of a carrier, an anvil, a carrier ram, and an anvil ram; the carrier and anvil being in spaced substantially end-to-end relation; the carrier having an open-ended passageway extending longitudinally therein and adapted slidably to accommodate said blank, said carrier ram being slidably movable within said passageway between a retracted position for engagement with the rear end of the blank operatively disposed within the passageway and a projected position for partially ejecting the blank through the front of said passageway and into pressing engagement with the anvil; the anvil having an open-ended bore extending longitudinally therein, said bore being adapted to slidably accommodate therein said tang, said anvil ram being slidably movable within said bore between a retracted position for engagement with the front end of the tang operatively disposed within the bore and a projected position for partially ejecting the tang through the rear of the bore; the said bore being in longitudinal alignment with the said passageway, whereby the tang will be brought into penetrating and attaching engagement with the blank when the blank is in operative engagement with the anvil and the tang is in said partially ejected position.

3. In an apparatus for manufacturing from a blank and a tang a cutlery implement with a bolster thereon, the combination according to claim 2, further provided with a coiled heating member disposed between the carrier and anvil and adjacent the rear operative end of the anvil, said heating member being proportioned to permit the forward terminal of the blank to pass through the coiled portion thereof during the blank's operative movement towards the anvil.

4. In an apparatus for manufacturing from a blank and a tang a cutlery implement with a bolster thereon, the combination according to claim 2, further provided with a coiled heating member disposed between the carrier and anvil and adjacent the rear operative end of the anvil, the coiled portion of the heating member being proportioned to accommodate therein the foremost terminal of the blank when enlarged a predetermined amount due to the combined effect of its said operative pressure against the anvil and the heat of the said heating member.

5. In an apparatus for manufacturing from a blank and a tang a cutlery implement with a bolster thereon, the combination according to claim 2, further provided with forming means comprising complementary die members positioned in flanking relation to the forward terminal of said blank when it is in engagement with the anvil, said die members being movable transversely for operative engagement with said forward terminal.

6. In an apparatus for manufacturing from a blank and a tang a cutlery implement with a bolster thereon, the combination according to claim 2, further provided with a coiled heating member disposed between the carrier and anvil and adjacent the rear operative end of the anvil, further provided with forming means comprising complementary die members positioned adjacent said heating member and movable transversely for operative engagement with the forward terminal of the blank when it is in its foremost projected position.

7. In an apparatus for manufacturing from a blank and a tang a cutlery implement with a bolster thereon, the combination according to claim 2, further provided with a coiled heating member disposed between the carrier and anvil and adjacent the rear operative end of the anvil, the coiled portion of the heating member being proportioned to accommodate therein the foremost terminal of the blank when enlarged a predetermined amount due to the combined effect of its said operative pressure against the anvil and the heat of the said heating member, further provided with forming means comprising complementary die members positioned adjacent said heating member and movable transversely for operative engagement with the said enlarged foremost terminal of the blank.

8. In an apparatus for manufacturing from a blank and a tang a cutlery implement with a bolster thereon, the combination according to claim 2, further provided with forming means comprising complementary die members flanking the rear portion of the anvil and movable transversely for operative engagement with the forward terminal of the said blank when it is in engagement with the anvil, said anvil being retractable to permit the transverse operative movement of said die members.

9. In an apparatus for manufacturing from a blank and a tang a cutlery implement with a bolster thereon, the combination according to claim 2, further provided with forming means comprising complementary die members positioned in flanking relation to the forward terminal of said blank when it is in engagement with the anvil, said die members being movable transversely for operative engagement with said forward terminal, the carrier being retractable to provide clearance between the carrier and anvil, whereby the blank and attached tang may be removed from the carrier.

10. In an apparatus for manufacturing from a blank and a tang a cutlery implement with a bolster thereon, the combination of a carrier, an anvil, a carrier ram, and an anvil ram; the carrier and anvil being in spaced substantially end-to-end relation; the carrier having a hopper for accommodating a plurality of said blanks, and an open-ended passageway communicating with said hopper and extending longitudinally therein and adapted slidably to accommodate one of said blanks, said carrier ram being slidably movable within said passageway between a retracted position rearwardly of said hopper, for engagement with the rear end of the blank operatively disposed within the passageway, and a projected position for partially ejecting the blank through the front of said passageway and into pressing engagement with the anvil; the anvil having an open-ended bore extending longitudinally therein, said bore being adapted to slidably accommodate therein said tang, said anvil ram being slidably movable within said bore between a retracted position for engagement with the front end of the tang operatively disposed within the bore and a projected position for partially ejecting the tang through the rear of the bore; the said bore being in longitudinal alignment with the said passageway, whereby the tang will be brought into penetrating and attaching engagement with the blank when the blank is in operative engagement with the anvil and the tang is in said partially ejected position.

11. In an apparatus for manufacturing from a blank and a tang a cutlery implement with a bolster thereon, the combination according to claim 10, said anvil also having a hopper for accommodating a plurality of said tangs, the said bore communicating with the last-mentioned hopper, the said retracted position of the anvil ram being forwardly of the anvil hopper.

12. In an apparatus for manufacturing from a blank and a tang a cutlery implement with a bolster thereon, the combination according to claim 2, the carrier being retractable from its foremost position a distance greater than the combined length of the blank and attached tang.

13. In an apparatus for manufacturing from a blank and a tang a cutlery implement with a bolster thereon, the combination according to claim 2, further provided with forming means comprising complementary die members positioned in flanking relation to the forward terminal of said blank when it is in engagement with the anvil, said die members being movable transversely for operative engagement with said forward terminal, the anvil being retractable from its fully projected position a distance greater than the length of said dies measured in the direction of the longitudinal extent of the apparatus.

BERNARD M. MILLER.

REFERENCES CITED

The following references are of record in the file of this patent:

UNITED STATES PATENTS

| Number | Name | Date |
|---|---|---|
| 378,287 | Chadwick et al. | Feb. 21, 1888 |
| 578,877 | Hussey | Mar. 16, 1897 |
| 1,212,969 | Lamb et al. | Jan. 16, 1917 |
| 1,496,415 | Hobson | June 3, 1924 |
| 2,372,531 | Standish | Mar. 27, 1945 |